US008480272B2

(12) United States Patent
    Day

(10) Patent No.: US 8,480,272 B2
(45) Date of Patent: Jul. 9, 2013

(54) VEHICLE EXTERIOR LIGHTING SYSTEM

(76) Inventor: Gregory A. Day, Markham, IL (US)

( * ) Notice: Subject to any disclaimer, the term of this patent is extended or adjusted under 35 U.S.C. 154(b) by 242 days.

(21) Appl. No.: 13/012,399

(22) Filed: Jan. 24, 2011

(65) Prior Publication Data

US 2011/0181185 A1    Jul. 28, 2011

Related U.S. Application Data

(60) Provisional application No. 61/297,591, filed on Jan. 22, 2010, provisional application No. 61/383,807, filed on Sep. 17, 2010.

(51) Int. Cl.
    *B60Q 1/00*    (2006.01)
    *B60Q 1/26*    (2006.01)
    *B60Q 1/14*    (2006.01)

(52) U.S. Cl.
    USPC .............................................. 362/487; 315/77

(58) Field of Classification Search
    None
    See application file for complete search history.

(56) References Cited

U.S. PATENT DOCUMENTS

| 4,981,363 A | * | 1/1991 | Lipman | 362/503 |
| 5,010,454 A | * | 4/1991 | Hopper | 362/487 |
| 6,910,788 B2 | | 6/2005 | Jones | |

* cited by examiner

*Primary Examiner* — Douglas W Owens
*Assistant Examiner* — Dedei K Hammond
(74) *Attorney, Agent, or Firm* — Miller, Matthias & Hull LLP

(57) ABSTRACT

An exterior lighting system for a vehicle is disclosed. The lighting system may include a plurality of lights provided proximate the wheel-wheels of the vehicle. The plurality of lights may be illuminated upon a brake pedal of the vehicle being depressed, a turn signal lever of the vehicle being activated, or upon a driver entering a desired setting into an operator interface of the system. The lighting system may be used as a safety feature to provide approaching vehicles better warning of a braking, slowing, or turning vehicle. The lighting system may also be used during roadside repair to warn other vehicles and/or to provide illumination for the repair. The lighting system may also be used for entertainment or accessorizing purposes enabling the user to select from a plurality of lighting sequences stored in the memory of the system.

10 Claims, 17 Drawing Sheets

VEHICLE EXTERIOR LIGHTING SYSTEM

CROSS-REFERENCE TO RELATED APPLICATIONS

This application is a non-provisional application claiming priority under 35 U.S.C. §119(e) to U.S. Provisional Application No. 61/383,807, filed on Sep. 17, 2010, and U.S. Provisional Application No. 61/297,591, filed on Jan. 22, 2010.

BACKGROUND

1. Technical Field

This disclosure generally relates to vehicle lighting equipment and, more particularly, relates to exterior lighting systems for vehicle safety and/or visual effects.

2. Description of the Related Art

Automobiles have become ubiquitous in modern society. People rely on their cars and trucks to get them from their homes to their places of employment, to make it to appointments, to meet friends, go to restaurants, travel and vacation just to name a few examples. Speaking domestically, cars and the independence they provide to their owners, have been largely credited with the rapid westward expansion of this country from its earliest east coast urban areas, and to continue to allow for easy migration of workers from region to region depending on labor demands among other things.

While effective and hugely successful, cars have been continuously improved over the years. One area of improvement has focused on safety. Head lights, brake lights, seat belts, air bags, anti-lock brakes, side-impact door beams, crumple zones, and impact protected gas tanks are all examples of features that automobiles did not, at first, possess.

Taking brake lights as an example, the very first automobiles did not have any mechanism for telling another automobile approaching from behind that another car was slowing or stopped. Accordingly, brake lights were installed to provide such communication. Such lights were typically provided proximate the rear bumper or trunk, but over time, regulations were passed to require additional brake lights to also be placed higher, proximate the rear window so as to be more in the line-of-sight of the approaching vehicle.

That being said, the industry continues to seek further safety improvements. Depending on the exact angle of approach, current brake lights may not provide adequate warning for approaching vehicles. This problem may be augmented by ambient conditions such as fog, drizzle, or snowfall. In addition, such snow may accumulate on the brake lights further limiting their efficacy and hindering the ability of other drivers to spot the car and its brake lights. Moreover, sleet or icy conditions may build up on the windshield and other windows of vehicles limiting the ability of the oncoming driver from seeing the stopped or slowing vehicle as well as he or she normally may.

The same can be said of turn signals. Such signals are typically provided as part of the same lighting assembly as the brake lights. Often they are of a different color, such as orange or yellow instead of red, but sometimes they too are red and simply flash intermittently to warn other motorists of an upcoming turn. The intermittent flash is supposed to distinguish the steady brightened nature of brake lights, but depending on operator actions such as tapping or pumping the brakes, this may also provide inadequate warning to other motorists.

The vehicle exterior lighting equipment discussed above are all examples of safety equipments developed to provide a safer driving environment and/or to protect the driver and passengers while the vehicle is in motion. Some automobile accidents, however, occur when a vehicle is parked on the roadside for emergency repair such as tire change, coolant refill, engine oil refill, battery recharge, while other vehicles pass by, usually in medium or high speeds. As the road shoulders are narrow, the moving vehicle may hit or even crash into the parked vehicle when the driver of the moving vehicle is negligent or otherwise loses control of the vehicle. The likelihood of roadside accident may further increase when the weather (rain, snow, fog, etc.) and/or road conditions (curves, potholes, slopes, etc.) interfere with the safe operation of the moving vehicle. As the driver and/or passengers are typically outside of, and standing right next to, the vehicle, most in-vehicle safety equipment may provide little, if any, protection to the driver and passengers.

Thus, emergency roadside vehicle repairs need to be conducted with great caution with sufficient warnings provided to the moving vehicles well ahead of the parked vehicle. To that end, the parked vehicle may turn on its emergency lights (i.e. flashing taillights). However, the warning provided by the emergency light may be insufficient, especially when one or both of the taillights are dim or burnt-out. Moreover, as the taillights are positioned relatively low, they may be blocked by roadside objects and/or people standing by the vehicle and become less visible to other drivers on the road.

Further, additional lighting may be desirable or required for the driver and/or passenger to conduct the roadside repair, especially during dark hours. For example, tire changes may require lighting around the wheel well and fluid refill may require lighting under the hood. Generally, lighting for roadside repair is provided by battery-powered flashlights. However, the batteries may be drained at the time of roadside repair. Moreover, as most flashlights need to be held by one hand, roadside repair may become difficult or even impossible when the repair needs both hands and when the driver is alone during the repair. Finally, the illumination provided by flashlights may be too limited and/or concentrated for some repair operations.

A still further area where exterior automobile lighting has grown in popularity is with respect to personalized accessories. For example, some drivers like to light the undercarriage of their automobiles with colored lighting to draw attention to themselves. This feature may be accentuated by providing pneumatic shocks on the car to allow it to be quickly raised and lowered relative to the ground. While desirable for some, this too represents an area for potential improvement with drivers wanting more unique lighting capabilities and features.

SUMMARY OF THE DISCLOSURE

In accordance with one aspect of the disclosure, an exterior lighting system for an automobile is disclosed which comprises a plurality of lights positioned proximate the wheel-wells of an automobile, a processor in electronic communication with the plurality of lights, and an operator interface provided within the interior of the vehicle enabling a driver to control the processor and plurality of lights.

In accordance with another aspect of the disclosure, a method of lighting an exterior of an automobile is disclosed which comprises providing a plurality of lights proximate each of the wheel-wheels of a vehicle, providing a processor in electronic communication with the plurality of lights, and illuminating the plurality of lights upon the processor receiving a signal from at least one of a brake pedal, a turn signal lever, and an operator interface.

In according with yet another aspect of the disclosure, a vehicle exterior lighting system for vehicle roadside repair is disclosed. The light system may include a housing adapted to be releasably attached to the top of a vehicle, a warning light attached to the top of the housing, and a repair light stored in and extendable from the housing to be attached to a different location of the vehicle. One or both of the warning and repair lights may be powered by a battery of the vehicle.

The repair light may include an anchoring base adapted to be attached to the exterior surface of a vehicle, a pivotable three-arm connector having one end connected to the anchoring base and another end connected to a goose-neck light. The anchoring base may be a suction cup, a magnet, or a combination of both. The connector may also include built-in lights to provide additional illumination.

These and other aspects and features of the disclosure will be better understood upon reading the following detailed description in conjunction with the accompanying drawings.

BRIEF DESCRIPTION OF THE DRAWINGS

For a more complete understanding of the disclosed lighting system and method of use thereof, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed apparatus or method which render other details difficult to perceive may have been omitted. It should be understood, of course, that this disclosure is not limited to the particular embodiments illustrated herein.

DETAILED DESCRIPTION OF THE DISCLOSURE

Figure 1:
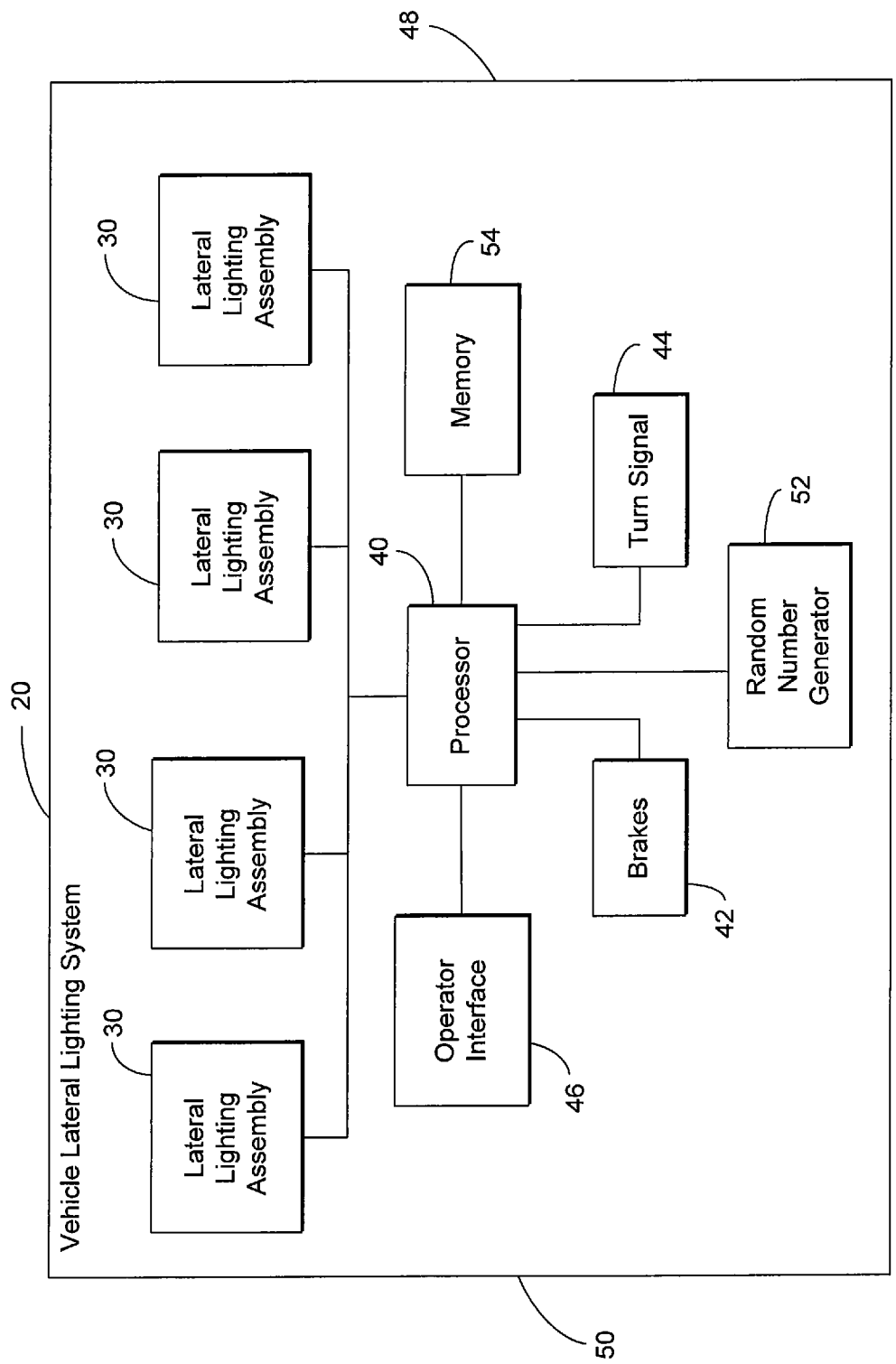
FIG. 1 is a schematic representation of a vehicle exterior lighting system constructed in accordance with the teachings of this disclosure.

Referring now to the drawings, and with specific reference to FIG. 1, a vehicle exterior lighting system constructed in accordance with the teachings of this disclosure is generally referred to by reference numeral 20. While the vehicle exterior lighting system 20 will be shown and described herein in conjunction with a passenger vehicle, it is to be understood that it can be used with equal efficacy with any on-highway vehicle including, but not limited to, automobiles, pick-up trucks, vans, delivery trucks, tractor-trailers, sport-utility vehicles, and the like.

Figure 2:
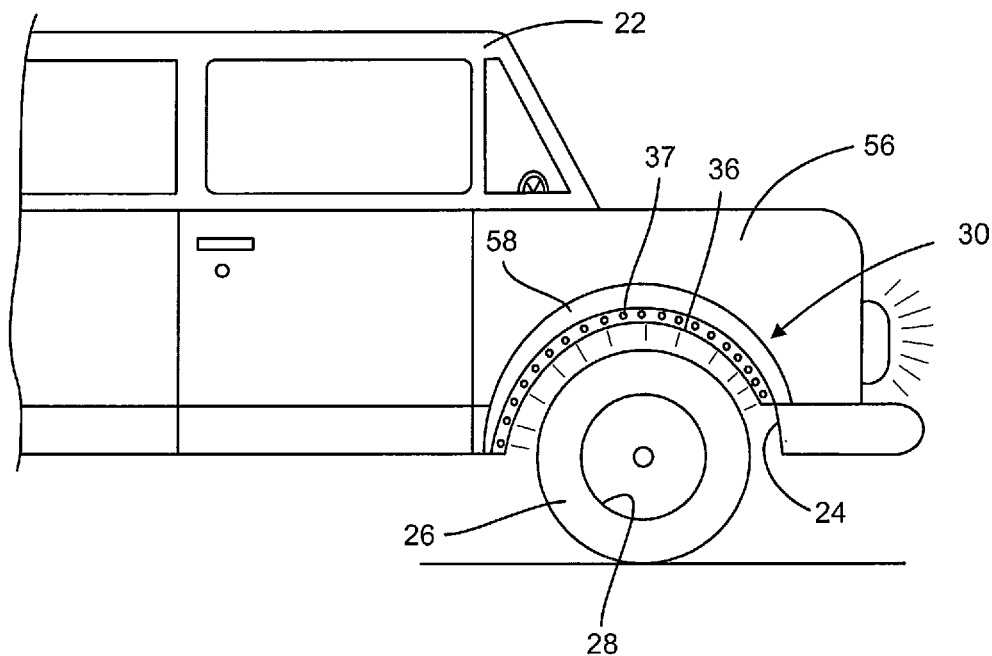
FIG. 2 is a side view of one embodiment of vehicle exterior lighting system constructed in accordance with the teachings of this disclosure.
Figure 3:
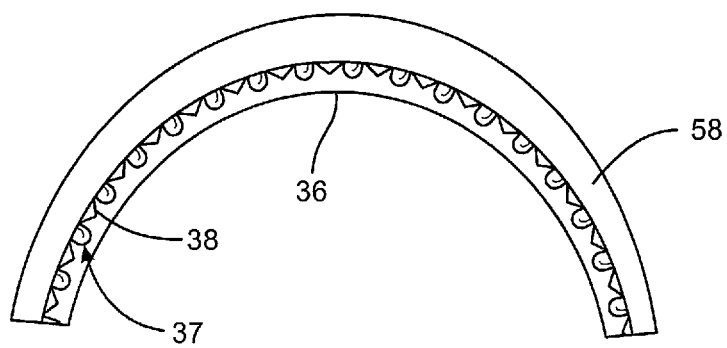
FIG. 3 is a front view of a lighting assembly used as part of the vehicle lighting system of FIG. 2.
Figure 4:
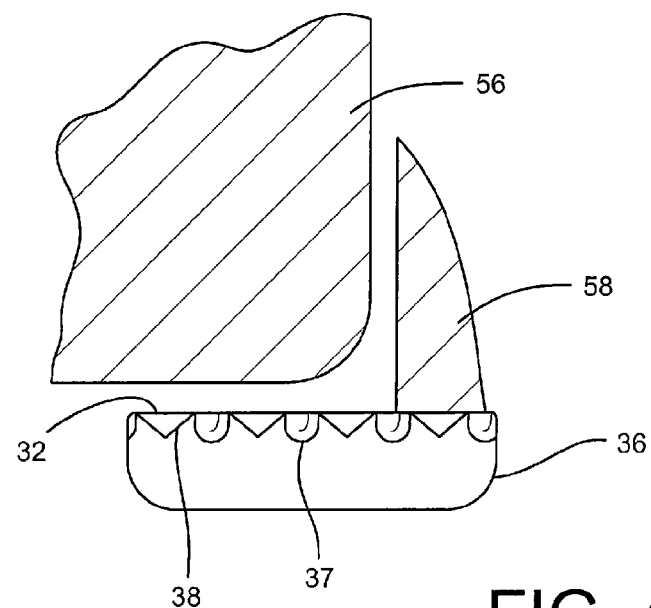
FIG. 4 is a cross-sectional view taken along line 4-4 of FIG. 2.
Figure 5:
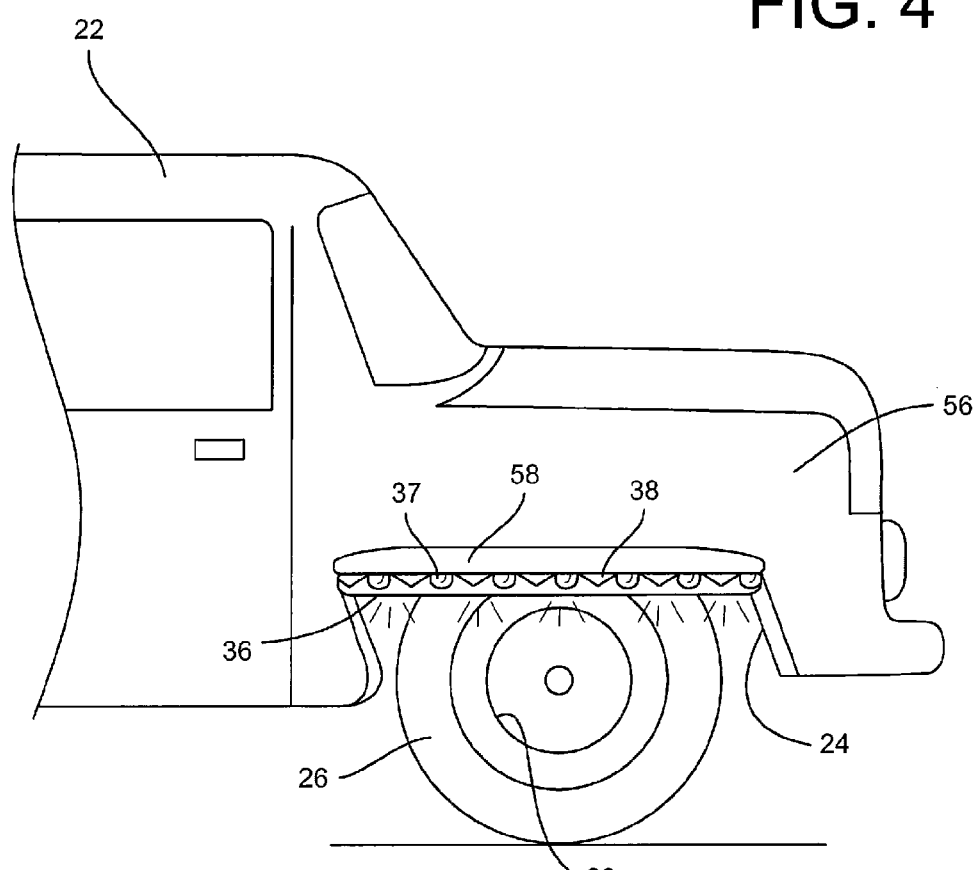
FIG. 5 is side view of another embodiment of the vehicle lighting system.
Figure 6:
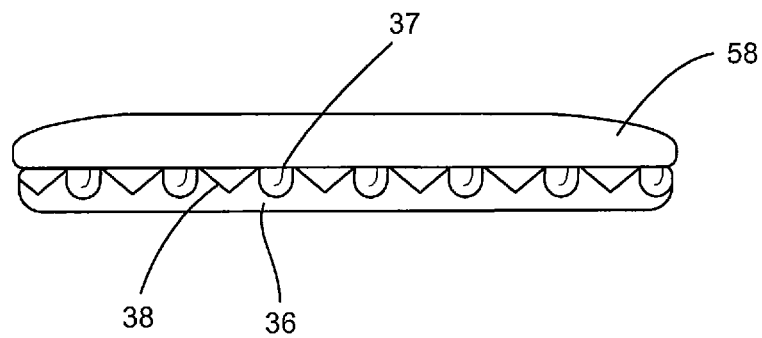
FIG. 6 is a front view of a lighting assembly used as part of the vehicle lighting system of FIG. 5.
Figure 7:
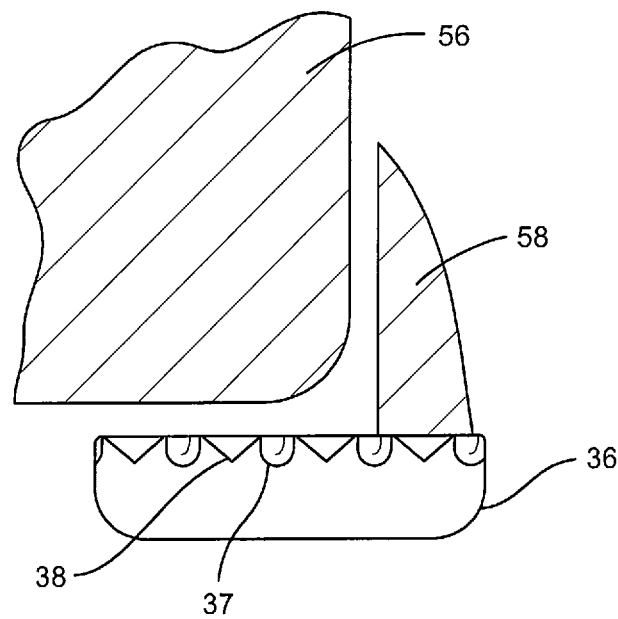
FIG. 7 is a cross-sectional view taken along line 7-7 of FIG. 5.

In reference to FIGS. 1 and 2, the vehicle exterior lighting system 20 may be used on a vehicle 22 to illuminate side or lateral portions of the vehicle 22 including, but not limited to wheel-wells 24, tires 26, and wheel rims 28. As indicated above, such exterior illumination can provide a key safety improvement to provide approaching vehicles of a slowing or stopped vehicle, or provide the user with a valuable light source when jacking up the vehicle 22 and changing the tire 26.

Figure 8:
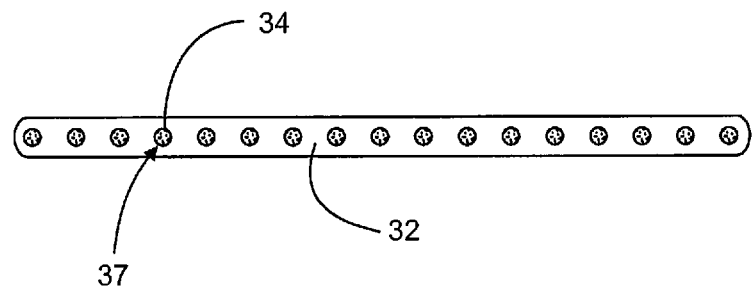
FIG. 8 is top view of an embodiment using individual bulbs.
Figure 9:
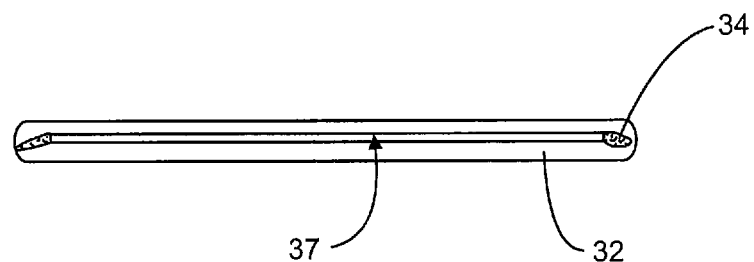
FIG. 9 is a top view of an embodiment using a unitary bulb.

The system 20 is able to do so by providing a lighting assembly 30 proximate each wheel-well 24. Each lighting assembly 30 may include one (FIG. 8) or a plurality of light bulbs 32 (FIG. 9) for illumination purposes. Each lighting assembly 30 may include a rear housing 32 with one or more bulb sockets 34 extending therefrom, and a protective and removable cover 36. In addition, one or more bulbs 37 may be mounted therein with reflective surfaces 38 provided in close proximity to maximize the lumen output of the lighting assembly 30. Such reflective surfaces may also be angled so as to direct the reflected light in a desired direction, i.e., laterally into the wheel-well 24, toward the tire 26, or laterally away from the vehicle 22. As used herein, the bulbs 37 may be provided in any conventional form known to one of ordinary skill in the art, including, but not limited to, incandescent, fluorescent, light-emitting diode (LED), compact fluorescent (CFL), or the like.

Each lighting assembly 30 may in turn be electrically connected to a processor 40, as shown best in FIG. 1. The processor 40 may be any form of conventional computing device such as but not limited to an on-board computer, or microprocessor, programmable logic controller, relay, or the like.

The processor 40 may be dedicated solely to the lateral lighting system 20 or may be one of the processors already provided by the vehicle manufacturer.

The processor 40 may be in electronic communication with a number of other vehicle components as well including, but not limited to a brake pedal 42, turn signal lever 44, and operator interface 46. Starting with the brake pedal 42, the processor may receive a signal therefrom that the driver is depressing same. Upon receipt of such a signal, processor 40 may cause each lighting assembly 30 to illuminate. In so doing, approaching vehicles are provided with an enhanced ability to tell that the vehicle 22 is stopped or slowing. This is particularly true for vehicles approaching from a lateral direction or during inclement weather or poor ambient/nighttime lighting conditions. As used herein, it is to be understood that brake pedal 42 includes other forms of braking systems or signals generated upon a brake being activated.

With respect to the turn signal lever 44, when the driver activates same, the processor 40 receives the corresponding signal and causes the lighting assemblies 30 to illuminate appropriately. More specifically, if the turn signal lever 44 is activated to show an upcoming right turn, the lighting assemblies 30 on the right hand side 48 of the vehicle 22 will illuminate. Similarly, if the turn signal lever 44 is activated to show an upcoming left turn, the lighting assemblies 30 on the left hand side 50 of the vehicle 22 will illuminate.

The processor 40 may also receive signals from the operator interface 46 to cause the lighting assemblies 30 to illuminate. For example, the dashboard (not shown) of the vehicle 22 may house the operator interface 46 and provide such things as switches, a touch screen, toggles or the like to allow the driver to activate the lighting assemblies 30. The options provided by the operator interface are myriad, but may include such commands or sequences as on/off, sequential, intermittent, simultaneous, random, forward, reverse, dimmed, brightened, dimming, brightening, left side, right side, front, back, and musically coordinated.

For example, the driver may wish to simply turn all the lighting assemblies 46 on simultaneously, in which case upon selecting same through the operator interface 46, all the lighting assemblies 30 would illuminate. Alternatively, perhaps the vehicle has a flat tire on the left, rear side, in which case that particular lighting assembly 30 could be illuminated to light up the corresponding wheel-well 24 and tire 26. Similarly, perhaps the driver would want to illuminate the entire left side to facilitate placement of the jack and raising of the vehicle 22.

If the lighting system 20 is being used simply for entertainment purposes, the driver may select sequential or random, example. In the former example, the lighting assemblies 30 would illuminate one after the other in either a clockwise or counterclockwise fashion. With the latter, the lighting assemblies would be illuminated in a non-predetermined pattern perhaps by a random number generator 52 provided as part of the processor 40.

In other examples, the lighting assemblies 30 could each be illuminated in progressively brighter or progressively dimmer fashion, or immediately at a maximum or minimum lumen output. The lighting assemblies 30 could also work in concert with the audio system (not shown) of the vehicle so as to illuminate the lighting assemblies 30 in accompaniment to the music being played.

Each of the foregoing lighting sequences could be stored in a memory 54 and recalled by the processor 40 upon appropriate activation of the operator interface 46. The memory 54 could be provided as part of the hard-disk space memory provided by the vehicle manufacturer, or the vehicle 22 could be retrofit to include suitable memory. In addition, the operator interface could include an input port such as a USB port enabling portable memory devices such as Flash Memory cards or the like to be connected to the system 20. In so doing, new light programming for different songs could be uploaded to the system 20.

The embodiments of FIGS. 2-4 and 5-7 are identical but for the shape of the fender 56 proximate the wheel-well 24. With the first embodiment of FIGS. 2-4, the fender 56 is rounded and thus the lighting assemblies 30 are rounded so as to be contiguous therewith. Similarly, with the second embodiment of FIGS. 5-7, the fender 56 is substantially straight across the front of the tire 26 and thus the corresponding lighting assembly 20 is substantially straight as well. Other shapes are certainly possible depending on the design of the vehicle. In light of this the lighting assembly 30 may be manufactured from a malleable material to allow it to conform to the shape of the fender 56. Alternatively, if the lighting system is built as original equipment with the vehicle manufacture, the lighting assemblies 30 could be made from the same material as the fender, provided unitary with the fender, or made as a decorative accent piece or fender trim 58 such as with chrome, polymers or the like.

Figure 10:
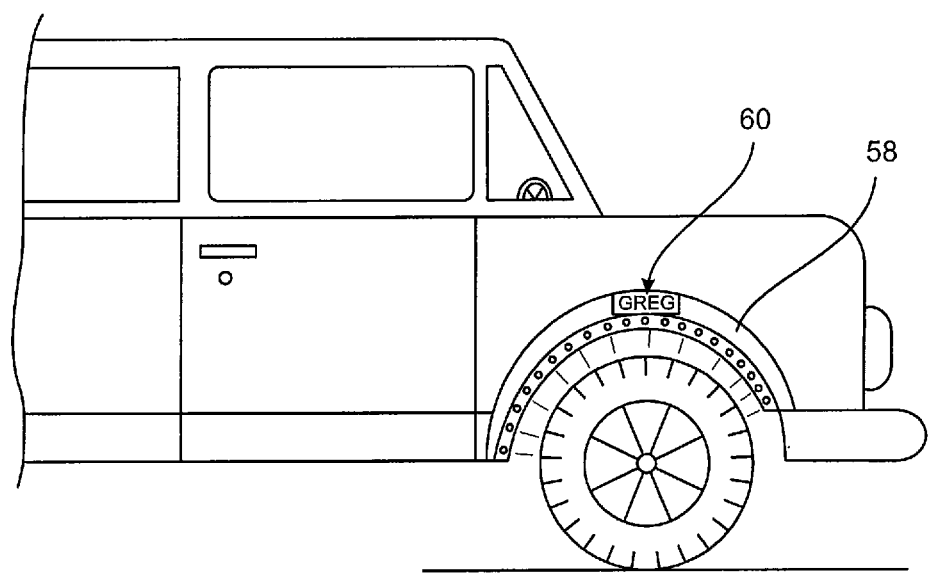
FIG. 10 is a side view of another embodiment of vehicle exterior lighting system constructed in accordance with the teachings of this disclosure.
Figure 11:
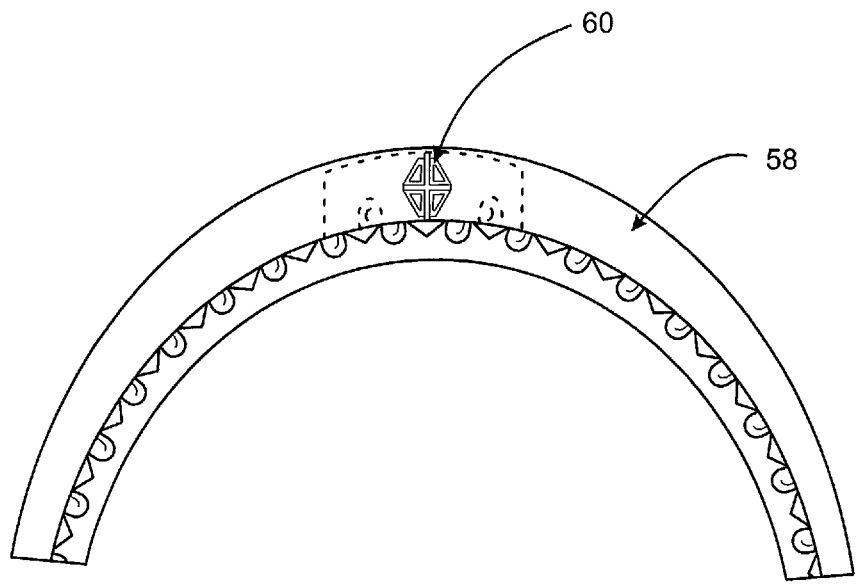
FIG. 11 is a front view of the lighting assembly used as part of the vehicle lighting system of FIG. 10.
Figure 12:
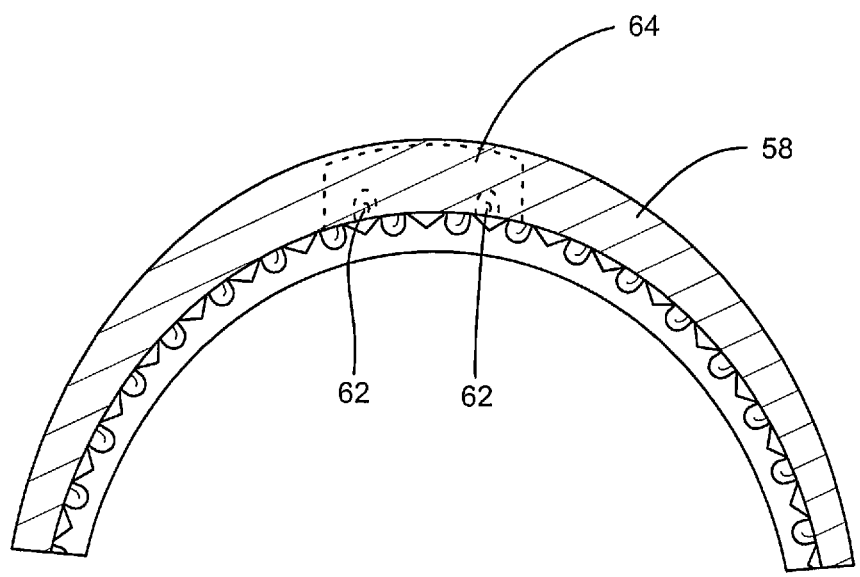
FIG. 12 is a back view of the lighting assembly used as part of the vehicle lighting system of FIG. 10.
Figure 13:
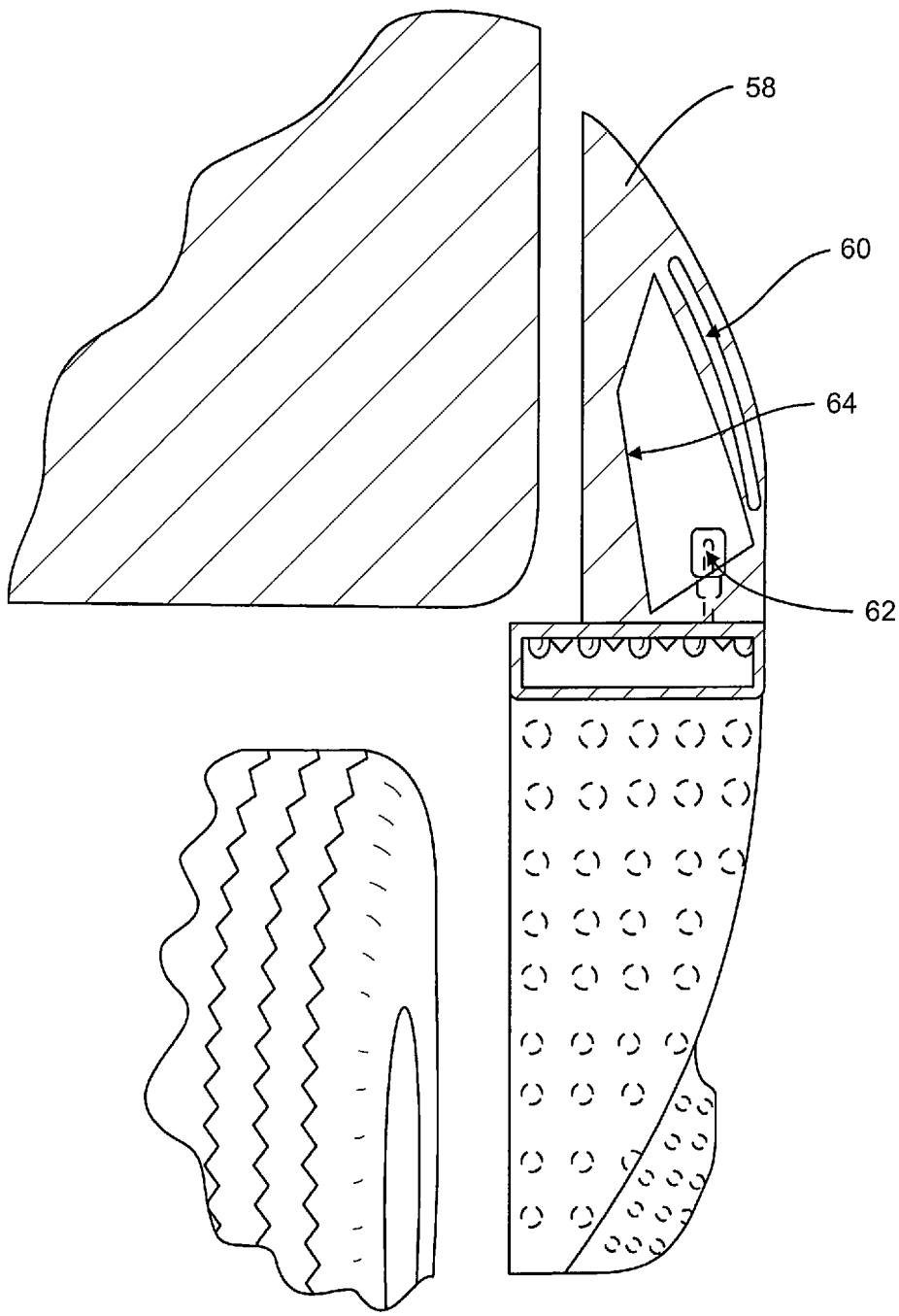
FIG. 13 is a cross-sectional view taken along line 13-13 of FIG. 10.

Referring now to FIG. 10, the fender trim 58 may further include an optional decorative window 60 for appearance and entertainment purposes. The window 60 may display, among other things, logos, symbols, graphic patterns, or other visual decorations. As illustrated in FIGS. 11-13, the decorative window 60 may be etched, carved, machined, or otherwise created into the fender trim 58. In order to illuminate the decorative window 60, the fender trim 58 may further include one or more light sources 62 and a reflective surface 64 to cast light through the decorative window 60. The light source 62 may be one or more regular light bulbs or LEDs or hybrids thereof. The reflective surface may be glass, metal, or other suitable surfaces. As illustrated in FIG. 13, the light source 62 and reflective surface 64 may be built within the fender trim 58 and disposed in close proximity to the decorative window 60 for enhanced aesthetic benefits.

From the foregoing, it can be seen that the present disclosure sets forth a vehicle exterior lighting system which provides enhanced safety and entertainment features. By providing lighting assemblies proximate each fender or wheel-well, approaching vehicles are provides with an indication of a slowed or stopped vehicle regardless of the angle from which they are approaching. Moreover, by mounting the lighting assemblies proximate each wheel-well, the driver is provided with lighting exactly where needed when changing a tire or the like. Finally, by connecting each lighting assembly to a central processor, the lighting assemblies can be controlled and illuminated in any desired fashion to draw attention to the vehicle.

Figure 14:
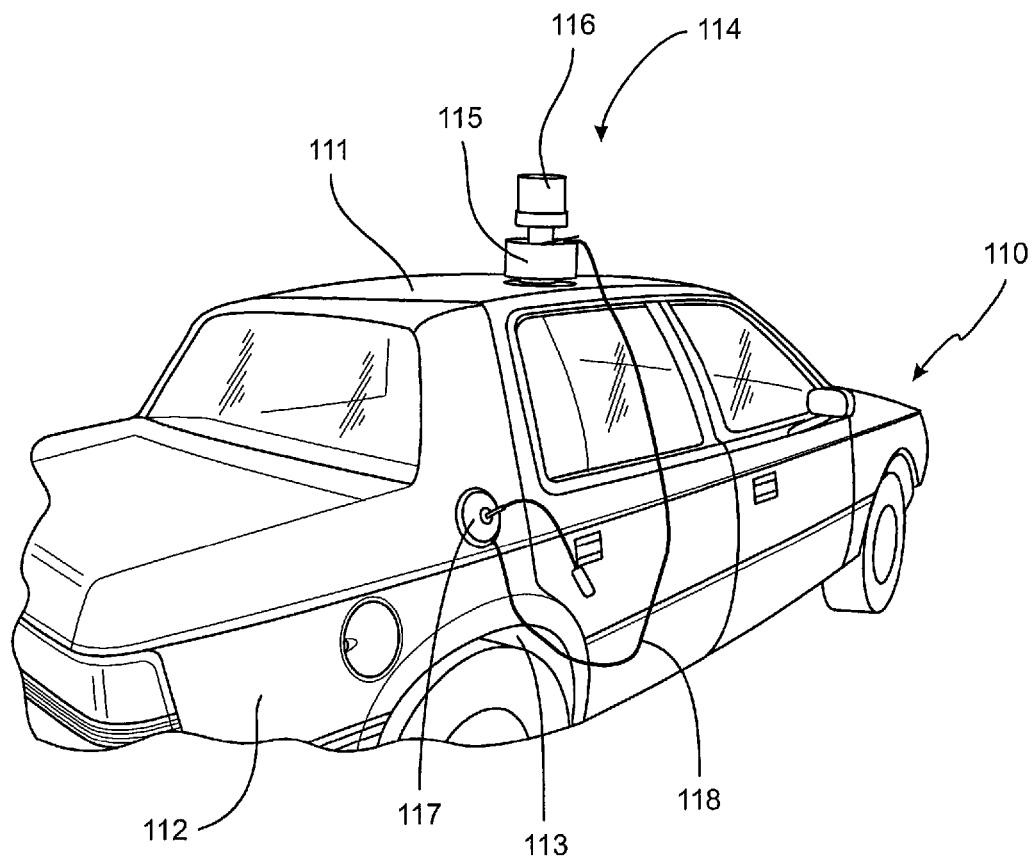
FIG. 14 is a photographic view of a lighting system mounted on a vehicle according to one aspect of this disclosure.

According to another aspect of this disclosure, a vehicle exterior lighting system for vehicle roadside repair is disclosed. Referring now to FIG. 14, a vehicle 110 is shown as having a roof 111 and a side body 112 with a wheel well 113. An integrated and portable lighting system 114 is shown as mounted on the vehicle 110 and including a housing 115, a warning light 116, and a repair light 117. The housing 115 is releasably attached to the roof 111 of the vehicle 110, such as by suction, magnet, or simply by resting on the roof 111. The warning light 116 is permanently attached to the housing 115 for convenience and better visibility. The repair light 117 is enclosed in the housing 115 for easy storage and is extendable from the housing 115 through a cable 118 to be attached to a different location of the vehicle, such as the side body 112 as illustrated in FIG. 14. One or both of the warning and repair lights (116, 117) may be connected to one or more electricity outlets of the car and/or can be powered by a battery (not shown) of the vehicle 110 even when the vehicle 110 is not running. Additional supplementary or alternative power sources such as regular batteries or rechargeable batteries, may also be used.

Figure 15:
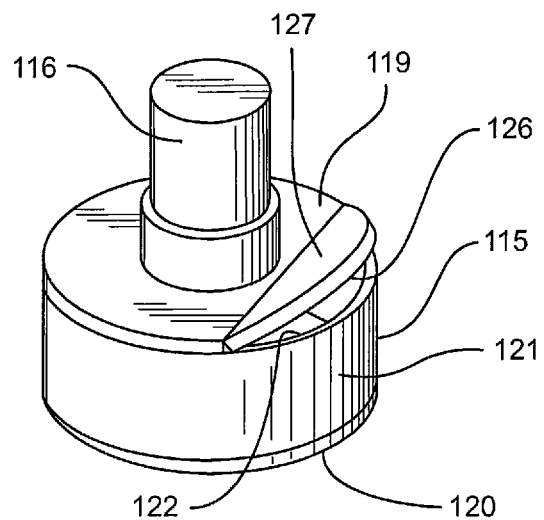
FIG. 15 is a schematic illustration of the lighting system in FIG. 14 (without the repair light)
Figure 16:
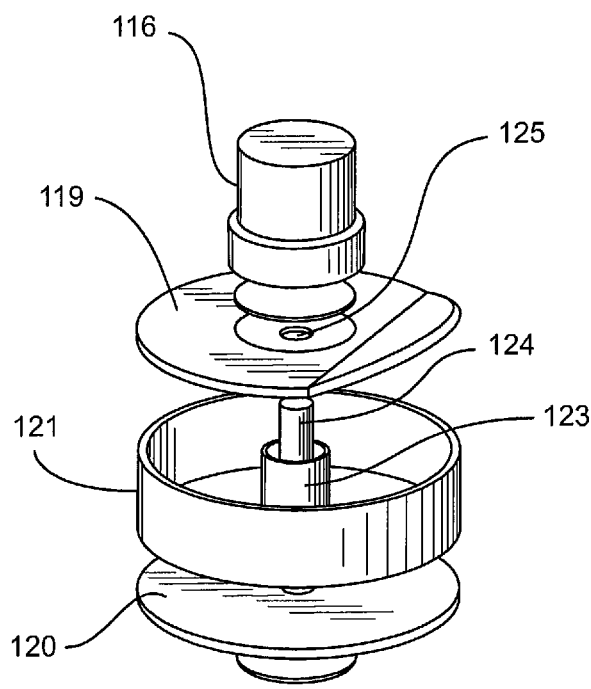
FIG. 16 is an exploded view of the lighting system in FIG. 15, particularly showing the rotatable top plate and center reel for extending and retracting the repair light.

Turning to FIGS. 15-16, the housing 115 includes a circular top wall 119, a circular bottom wall 120, and an annular sidewall 121 extending therebetween, defining an interior storage space 122. Also extending between the top and bottom walls (119, 120) is a center spool 123, upon which the cable 118 of the repair light 117 is wound. As illustrated in FIG. 16, the center spool 123 includes a top end 124 extending through a center opening 125 of the top wall 119, through which the warning light 116 is fixedly connected to the spool 123 (and housing 115) so that rotation of the warning light 116 can wind or unwind the cable 118 to extend or retract the repair light 117. The housing 115 may include one or more openings 126 (preferably closable) to provide access in and out of the storage space 122 for the cable 118 and repair light 117. As illustrated in FIGS. 15-16, the opening 126 may be provided in the top wall 119 of the housing 115 by including a flip-up section 127 hinged to the rest of the top wall 119, although other shapes, forms, and configurations of the openings 126 may also be used in light of this disclosure.

Figure 17:
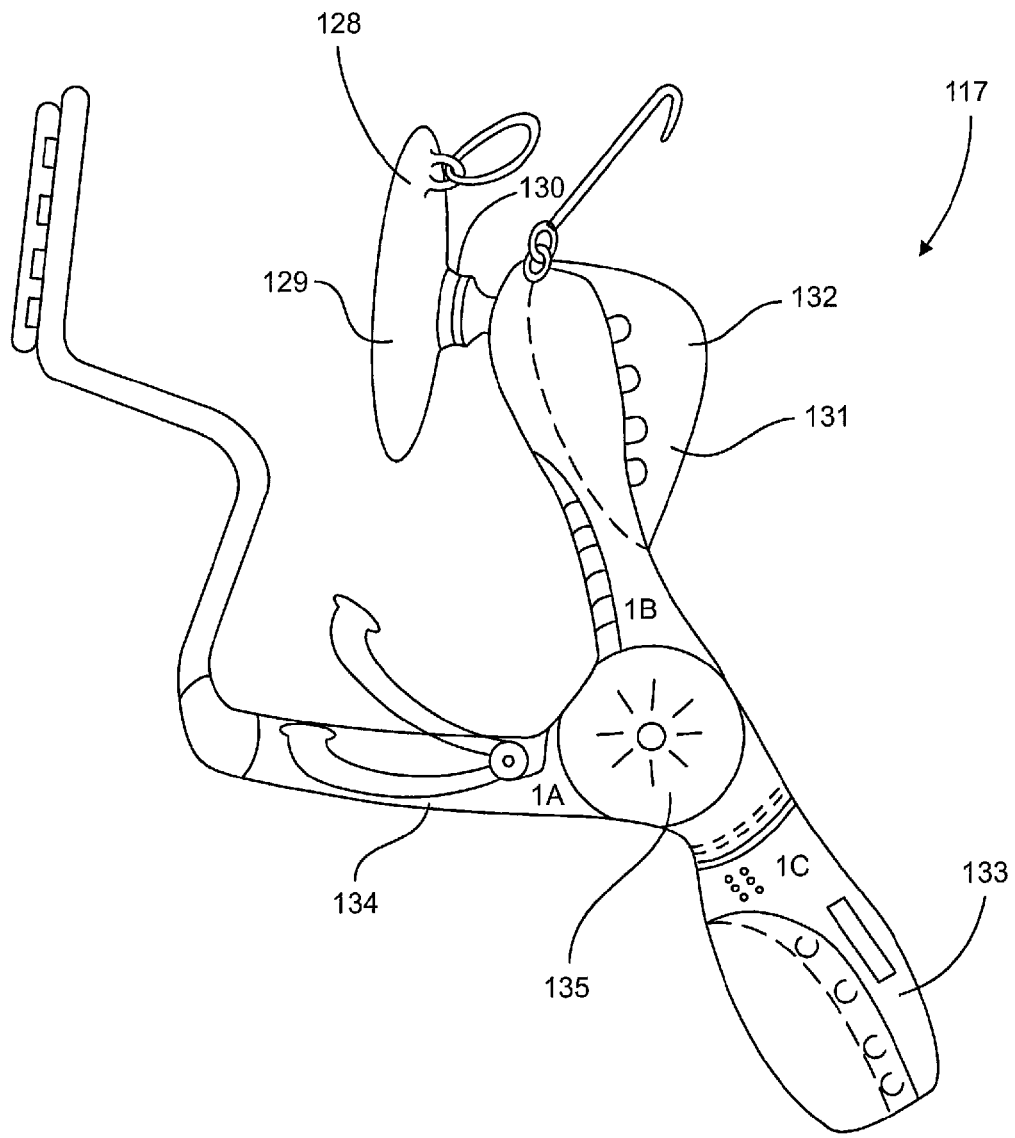
FIG. 17 illustrates a non-limiting embodiment of the repair light in FIG. 14.

Turning now to FIG. 17, the repair light 117 may include an anchoring base 128 adapted to be attached to the exterior surface of the vehicle 110 (such as the side body 112 above the wheel well 113 as illustrated in FIG. 14). The anchoring base 128 may be a suction cup 129 with an optional magnet 130 attached to, or integrated with, the suction cup 129 for extra security. Extending from the anchoring base 128 is a connector 131 for providing better positioning and maneuverability of the repair light 117. As illustrated in FIG. 17, the connector 131 may be a pivotable three-arm connector having an anchoring arm 132, a maneuvering arm 133, and a positioning arm 134 pivotably connected to one another through a pivoting connector 135. A hook may be provided to enable the light 117 to be used for alternative lighting purposes. In addition, a clock radio and speaker(s) or other audio and video electronics may also be included in the connector 131 as shown or otherwise.

Figure 18:
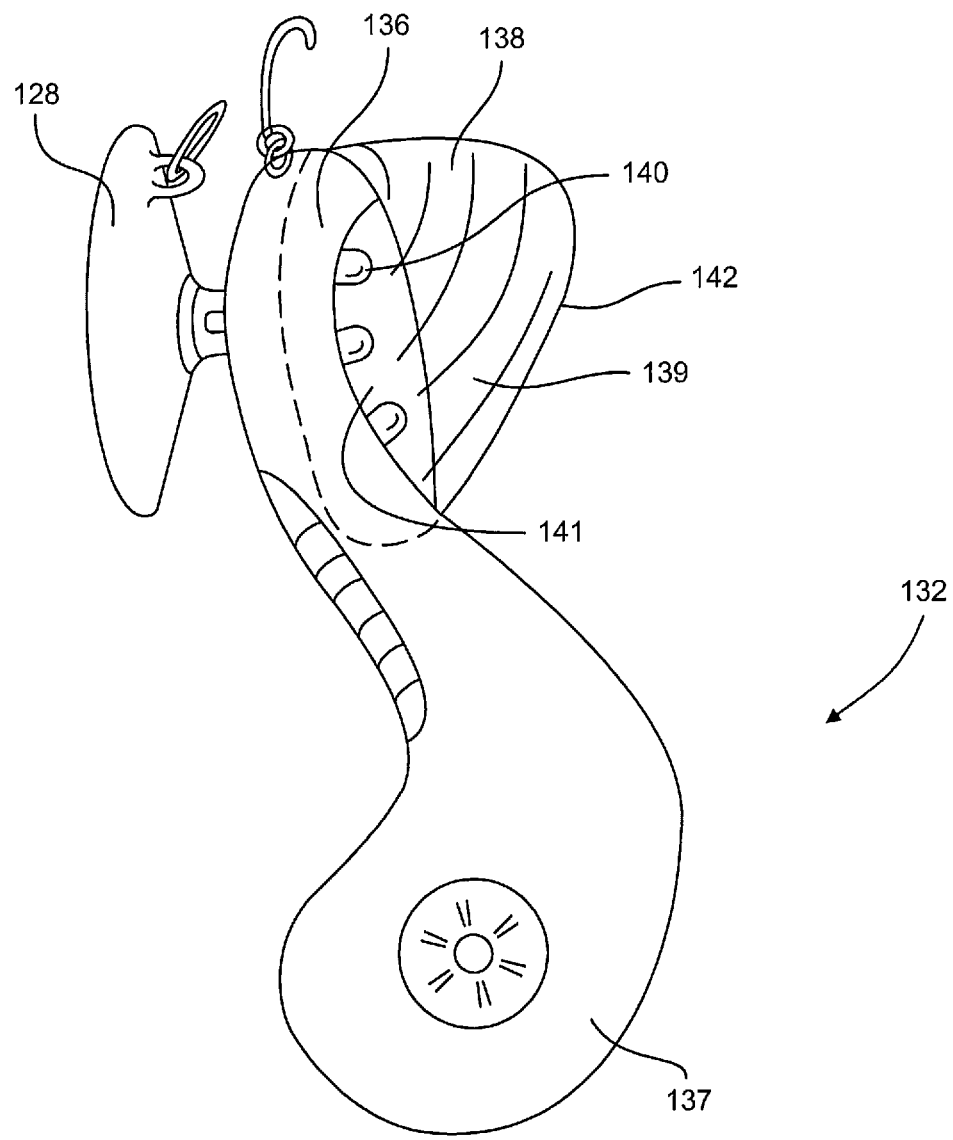
FIG. 18 is a partial view of the repair light in FIG. 17, particularly showing the anchoring base and the first arm of the connector.

As illustrated in FIG. 18, the anchoring arm 132 includes a first end 136 pivotably connected to the anchoring base 128 and a second end 137 connected to the pivoting connector 135. The first send 136 may also include an auxiliary light 138 having a housing 139 and a light source 140, such as a plurality of LED lights, disposed in the housing 139. The housing 139 may include a light-reflecting base 141 and a dome-shaped cover (optionally colored) 142. The auxiliary light 138 may provide additional illumination for warning, repair, or both. The anchoring arm 132 may also include a rubber grip portion in its middle section so as to facilitate the handling of the anchoring arm 132.

Figure 19:
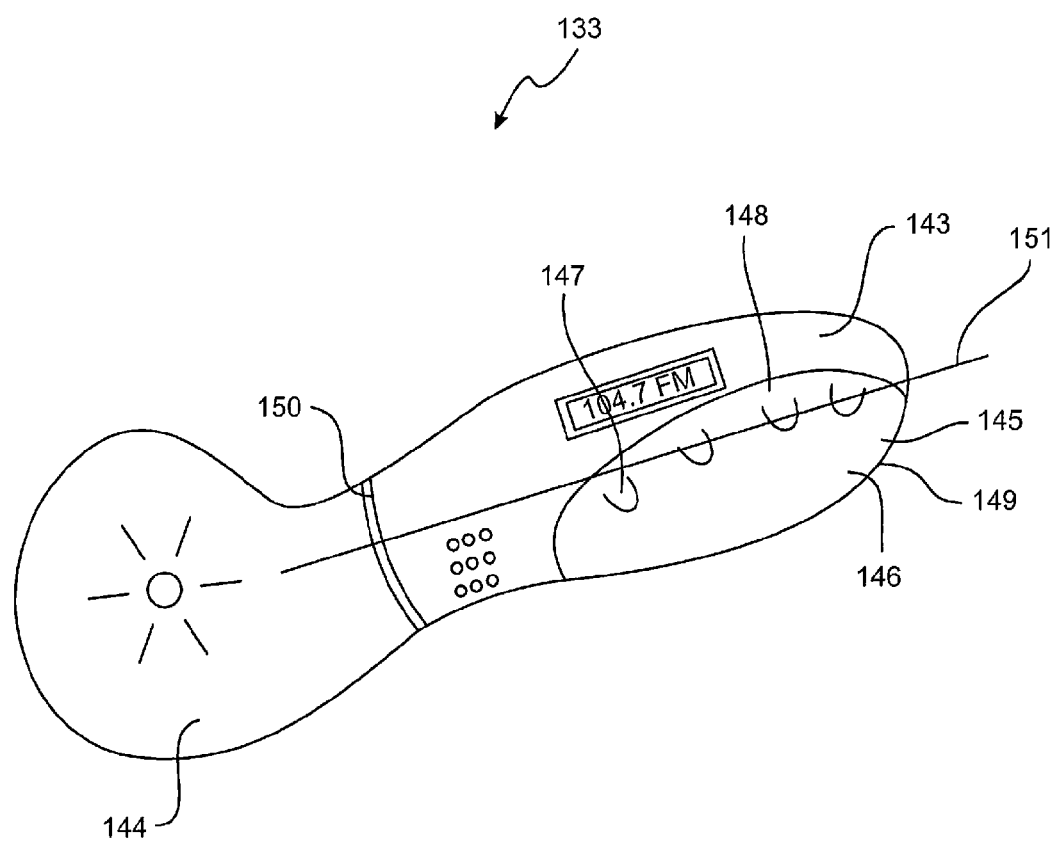
FIG. 19 is a partial view of the repair light in FIG. 17, particularly showing the second arm of the connector.

Turning to FIG. 19, the maneuvering arm 133 includes a free-standing first end 143 and a second end 144 connected to the pivoting connector 135. The first end 143 may also include an auxiliary light 145 having a housing 146 and a light source 147, such as a plurality of LED lights, disposed in the housing 146. The housing 146 may include a light-reflecting base 148 and a dome-shaped cover (optionally colored) 149. The auxiliary light 145 may provide additional illumination for warning, repair, or both. The anchoring arm 132 may also include an annular rotation connector 150 so that the first end 143 may be rotated around its center axis 151 to adjust the illumination provided by the auxiliary light 145.

Figure 20:
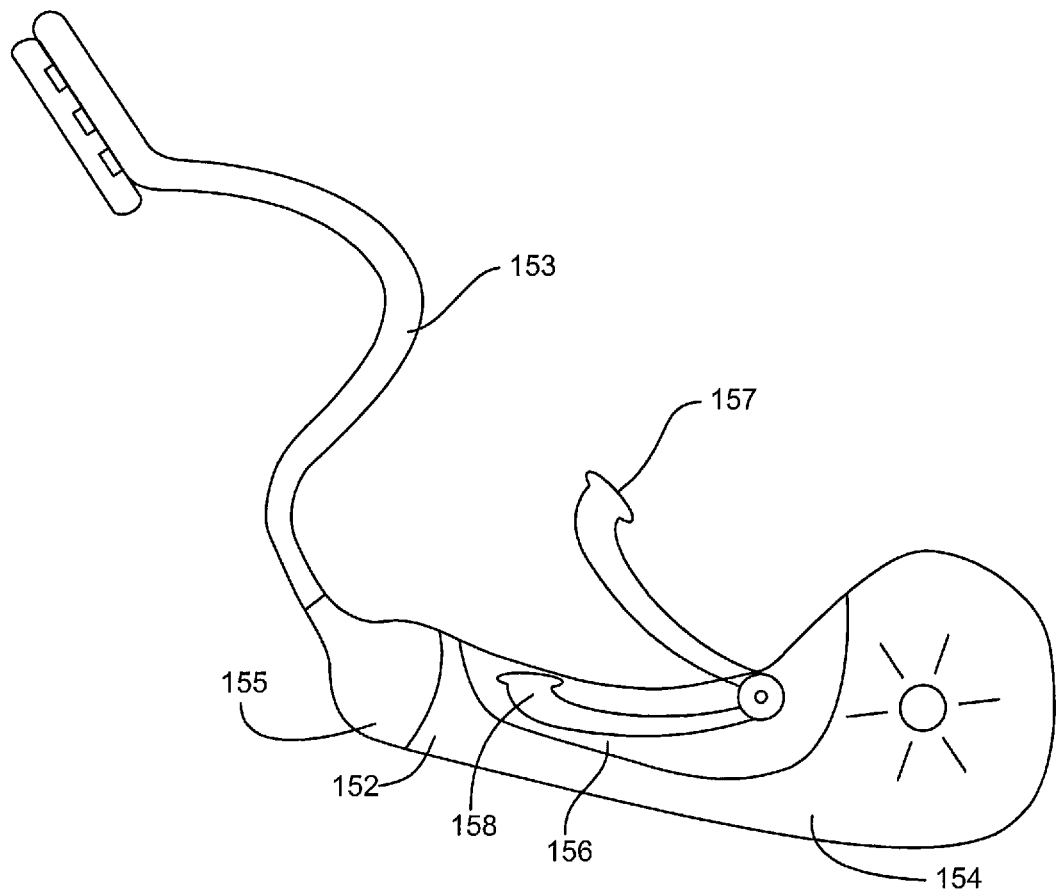
FIG. 20 is a partial view of the repair light in FIG. 17, particularly showing the goose-neck light and the third arm of the connector.

Referring now to FIG. 20, the positioning arm 134 includes a first end 152 connected to a gooseneck light 153 extending toward a repair location, and a second end 154 connected to the rotation connector 135. The first end 152 includes a boot 155 to protect the mechanical and electric connections between the positioning arm 134 and gooseneck light 153. The positioning arm 134 may also include a rubber grip portion 156 in its middle section so as to facilitate the handling of the positioning arm 134. As illustrated in FIG. 20, the positioning arm 134 may further include a security bracket 157 to provide additional mechanical support. The security bracket 157 may be recessed in a slot 158 provided on the grip portion 156 of the positioning arm 124 and may be pivotably extended to a deployed position when extra security is needed. The gooseneck light 153 may also be replaced by other suitable lights in light of this disclosure.

Figure 21:
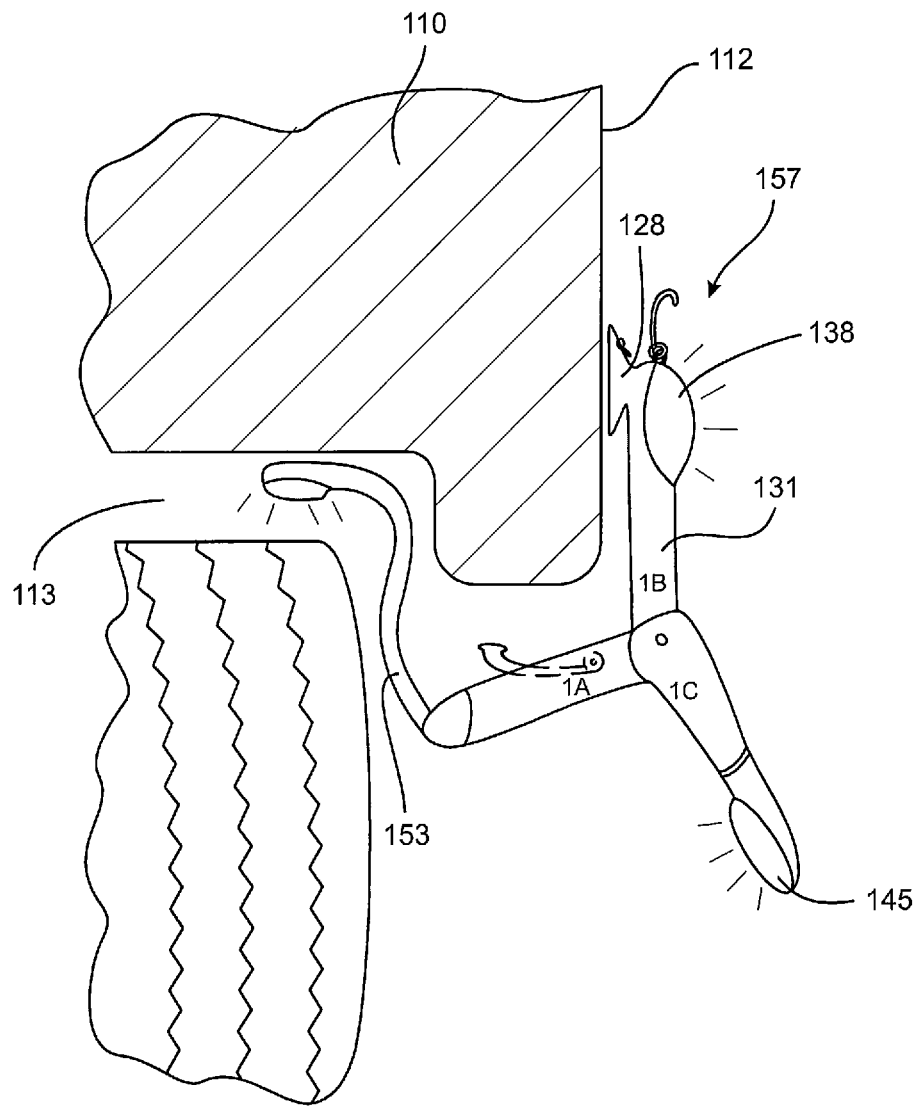
FIG. 21 is a schematic illustration of the repair light in FIG. 17 as mounted on a vehicle.

FIG. 21 illustrates the use of the repair light 117 in a tire change operation. The anchoring base 128 is secured to the outside body 112 of the vehicle 110 above the wheel well 113. The three-arm connector 131 and gooseneck light 153 are maneuvered so that sufficient illumination under and around the wheel well 113 can be provided by the gooseneck light 153 and auxiliary light 145, while the additional illumination above the wheel well 113 can be provided by the auxiliary light 138. After the repair is done, the repair light 117 can be folded into a relatively compact unit by pivoting the arms of the connector 117 and maneuvering the gooseneck light 153. Thereafter, the repair light 117 can be retracted to (by rotating the warning light 116) and stored within the storage space 122 of the housing 115 as illustrated in FIGS. 15-16. Additional safety and/or repair equipments, such as light-reflecting vests and hand tools, may also be stored in the storage space 122.

Figure 22:
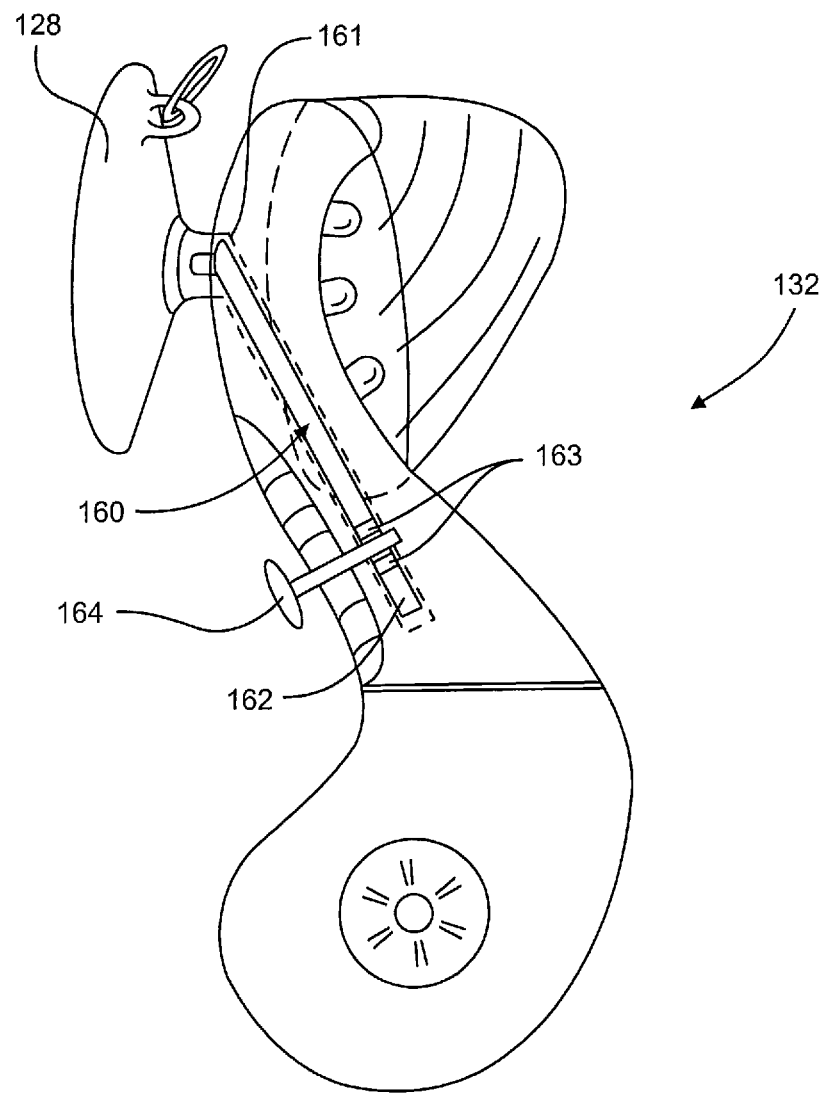
FIG. 22 illustrates an alternative embodiment of the anchoring base and the first arm of the connector shown in FIG. 18, particularly illustrating the extendable and retractable anchoring base.
Figure 23:
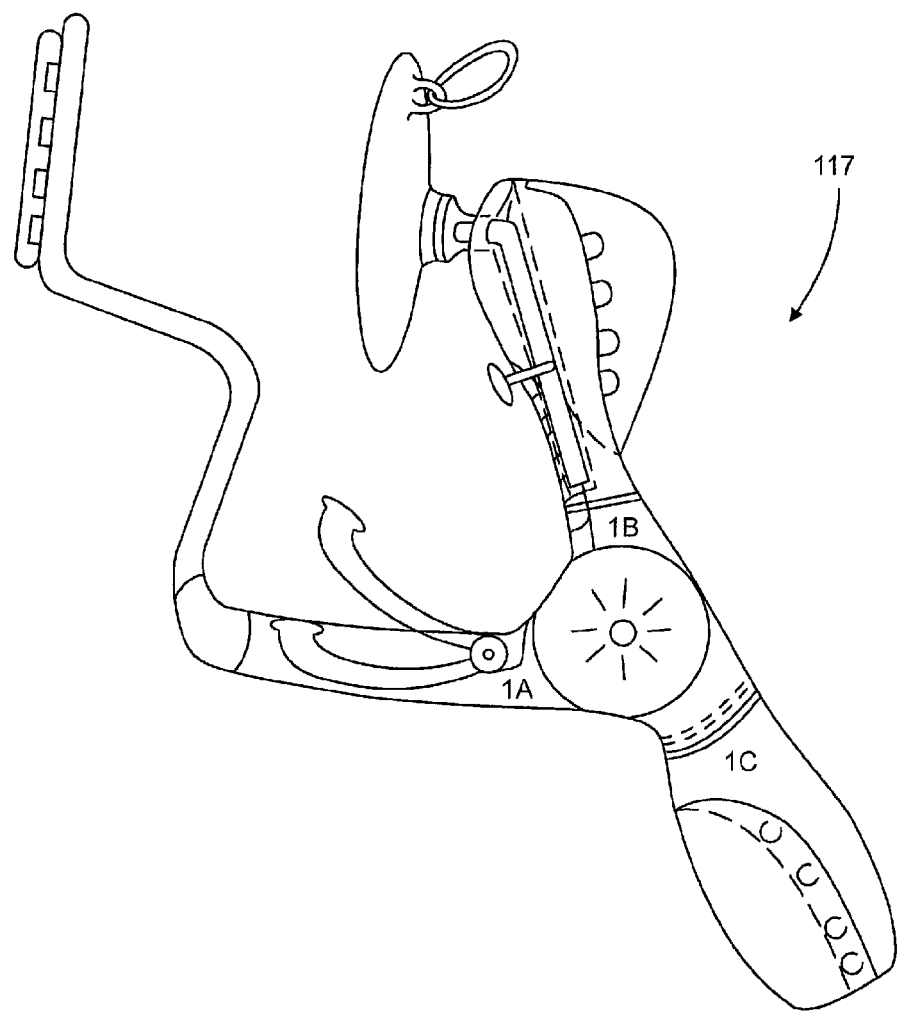
FIG. 23 illustrates an alternative embodiment of the repair light shown in FIG. 17, particularly illustrating the extendable and retractable anchoring base.

FIGS. 22 and 23 illustrate alternative embodiments of the anchoring arm 132 of the repair light 117. As shown in FIGS. 22-23, the anchoring arm 132 may include an optional extension arm 160 having a first end 161 pivotably connected to the anchoring base 128, and a second end slidably disposed within the anchoring arm 132. The extension arm 160 also includes a plurality of pinholes 163 between the first and second ends (161, 162), through which the extension arm 160 could be secured to the anchoring arm 132 with a locking pin 164 inserted through one of the pinholes 163. To extend or retract the anchoring arm from the anchoring base 128, a user can simply remove the locking pin 164, sliding the anchoring arm 132 towards or away from the anchoring base 128, and reinserting the locking pin 164 into one of the pinholes 163. The anchoring arm 132 may further include one or more light bulbs 165 as an alternative or backup light source. The light bulb 165 may be disposed in or close to the rotation connector 135.

While only certain embodiments have been set forth, alternative embodiments and various modifications will be apparent from the above descriptions to those skilled in the art. These and other alternatives are considered equivalents and within the spirit and scope of this disclosure.

What is claimed is:

1. An exterior lighting system for an automobile, comprising:
    a housing adapted to be releasably attached to the top of a vehicle;
    a warning light attached to the top of the housing; and
    a repair light stored in and extendable from the housing to be attached to a different location of the vehicle, the repair light comprising an anchoring base adapted to be attached to the exterior surface of a vehicle, a connector having one end connected to the anchoring base and another end connected to a goose-neck light.

2. The lighting system of claim 1, wherein at least one of the warning and repair lights is be powered by a battery of the vehicle.

3. The lighting system of claim 1, wherein the anchoring base comprises a suction cup.

4. The lighting system of claim 1, wherein the anchoring base comprises a magnet.

5. The lighting system of claim 1, wherein the connector is a pivotable three-arm connector.

6. The lighting system of claim 5, wherein the connector comprises an extension arm that allows the connector to be extended from or retracted toward the anchoring base.

7. The lighting system of claim 6, wherein the extension arm is pivotably connected to the anchoring base.

8. The lighting system of claim 6, wherein the extension arm comprises at least two pinholes and is secured to the connector through a locking pin inserted through one of the pinholes.

9. The lighting system of claim 1, wherein the connector comprises at least one built-in light to provide additional illumination.

10. The lighting system of claim 1, wherein the connector further comprises a clock radio.

\* \* \* \* \*